(12) United States Patent
Cunningham

(10) Patent No.: US 6,941,380 B2
(45) Date of Patent: Sep. 6, 2005

(54) BANDWIDTH ALLOCATION IN ETHERNET NETWORKS

(75) Inventor: Ian M. Cunningham, Burnstown (CA)

(73) Assignee: Nortel Networks Limited, Montreal (CA)

(*) Notice: Subject to any disclaimer, the term of this patent is extended or adjusted under 35 U.S.C. 154(b) by 894 days.

(21) Appl. No.: 09/749,758

(22) Filed: Dec. 28, 2000

(65) Prior Publication Data

US 2002/0087713 A1 Jul. 4, 2002

(51) Int. Cl.⁷ .............................. G06F 15/16; H04J 3/16
(52) U.S. Cl. ...................... 709/235; 370/229; 370/230; 370/468
(58) Field of Search ......................... 709/235; 370/229, 370/230, 468

(56) References Cited

U.S. PATENT DOCUMENTS

| | | | |
|---|---|---|---|
| 5,581,703 A | 12/1996 | Baugher et al. | |
| 5,701,465 A | 12/1997 | Baugher et al. | |
| 5,884,037 A | 3/1999 | Aras et al. | |
| 6,041,359 A | 3/2000 | Birdwell | |
| 6,470,029 B1 * | 10/2002 | Shimizu | 370/468 |
| 6,590,865 B1 * | 7/2003 | Ibaraki et al. | 370/230 |
| 6,647,008 B1 * | 11/2003 | Galand et al. | 370/389 |
| 6,690,678 B1 * | 2/2004 | Basso et al. | 370/468 |

FOREIGN PATENT DOCUMENTS

| | | |
|---|---|---|
| EP | 0 886 455 | 12/1998 |
| WO | WO 99/53719 | 10/1999 |

OTHER PUBLICATIONS

Martin Gitsels et al. "NetRAP –A Network Resource Allocation Protocol for IP over Ethernet", Computer Communications and Networks, 1997, IEEE Sep. 22, 1997, pp. 434–441.

* cited by examiner

Primary Examiner—Krisna Lim

(57) ABSTRACT

For assigning bandwidth in a constrained topology ethernet network there is presented a function that creates and manages a ledger of bandwidth requests over the ethernet network. The function, a bandwidth manager, tracks the total bandwidth of each link in the network and the bandwidth that has been reserved on each link. When traffic is granted reserved bandwidth the bandwidth manager notes this allocation in the ledger. The header of the traffic packets indicates that the traffic is of highest priority when the traffic has been given reserved bandwidth. In this manner the bandwidth manager can track and limit the amount of high priority traffic on the network.

12 Claims, 5 Drawing Sheets

BANDWIDTH ALLOCATION IN ETHERNET NETWORKS

FIELD OF THE INVENTION

The present invention relates to the allocation of bandwidth in constrained topology ethernet networks.

BACKGROUND OF THE INVENTION

Ethernet has become the most popular physical layer for local area networks and is finding a market in larger data networks (i.e. metropolitan area and wide area). The popularity of ethernet is due in part to the good balance found between cost, speed and installation and maintenance difficulty.

The desire to reduce operating costs in networks of all sizes has produced the movement towards networks that can provide multiple services, such as carrying voice, video and data. Many of the current solutions to this problem have relied on ATM switching to map multiple services onto a network. These ATM networks typically operate at speeds between DS-1 (1.544 kbps) to OC-48 (2.5 Gbps) but the cost resulting from the higher speed complex processing leads to expensive network solutions. In addition, as traffic demands grow the evolution to faster ATM products is very costly. Further, expensive equipment is required to connect to an ATM-based network.

While ATM cells are effective for controlling "first mile jitter" problems, they are inefficient for carrying both voice and data as the cells are too long for voice but too short for data.

The use of frame-based ethernet, especially Gigabit ethernet, as a solution for the problems encountered with data traffic using ATM switching has been capitalized in the metropolitan area network (MAN) by providers such as Yipes™ and Telseon™. However, current high-speed ethernet-based networks only provide a single data service.

As the transmission rate for ethernet has increased to 1 Gbps and 10 Gbps it becomes possible to mix real-time traffic with large data frames without incurring large delays since the real-time packets no longer incur a long delay waiting for the completion of the transmission of a large data packet. For example, a 1500 byte data packet only requires 1.2 microseconds on an Ethernet network where as at ATM OC-3 rates (150 Mbps) an ATM cell requires a similar order of magnitude time at 2.8 microsceonds.

Although ATM networks operate at slower speeds than other networks, for example ethernet-based networks, ATM provides a guaranteed level of service not provided by ethernet-based networks. ATM networks offer Quality of Service (QoS) that guarantees a throughput level on the network between origination and destination.

The advantage of ATM networks is that this QoS ensures that under traffic congestion conditions some users can be guaranteed that their traffic will never be discarded. This characteristics makes ATM attractive for real-time applications, such as circuit emulation, where even small amounts of information loss can severely impact the service. Ethernet networks on the other hand are only able to assign traffic to classes that have different traffic handling characteristics. Unfortunately, these classes do not guarantee that data within these classes is never discarded. If the total volume of traffic requests for a specific class exceeds the bandwidth assigned to that class traffic will be discarded.

Further, since the path taken by packets in an ethernet network is not known by the source and there is no switch by switch allocation of bandwidth on trunks, an ethernet network is not able to allocate bandwidth to specific data flows.

SUMMARY OF THE INVENTION

For assigning bandwidth in a constrained topology ethernet network there is presented a function that creates and manages a ledger of bandwidth requests over the ethernet network. The function, a bandwidth manager, tracks the total bandwidth of each link in the network and the bandwidth that has been reserved on each link. When traffic is granted reserved bandwidth the bandwidth manager notes this allocation in the ledger. The header of the traffic packets indicates that the traffic is of highest priority when the traffic has been given reserved bandwidth. In this manner the bandwidth manager can track and limit the amount of high priority traffic on the network.

In accordance with one aspect of the present invention there is provided a bandwidth manager for controlling bandwidth resources in an ethernet network having a plurality of nodes, selected pairs of nodes being separated by links of predetermined link bandwidth capacities, the ethernet network having a plurality of paths connecting at least two of the plurality of nodes together, each of said plurality of paths being composed of at least one link. The bandwidth manager includes: means for receiving a bandwidth reservation request including a requested bandwidth capacity, an origination point and a destination point; means for storing available bandwidth capacity for each link in the ethernet network; and means for reserving link bandwidth capacity on a selected one of the plurality of paths based on said bandwidth reservation request and said available bandwidth capacity for each link in the selected one of the plurality of paths.

In accordance with another aspect of the present invention there is provided a method of controlling bandwidth resources in an ethernet network having a plurality of nodes, selected pairs of nodes being separated by links of predetermined link bandwidth capacities, the ethernet network having a plurality of paths connecting at least two of said plurality of nodes together, each of said plurality of paths being composed of at least one link. The method includes the following steps: receiving a bandwidth reservation request including a requested bandwidth capacity, an origination point and a destination point; storing available bandwidth capacity for each link in the ethernet network; and reserving link bandwidth capacity on a selected one of the plurality of paths based on said bandwidth reservation request and said available bandwidth capacity for each link in the selected one of the plurality of paths.

In accordance with another aspect of the present invention there is provided a node on an ethernet network for controlling bandwidth resources, the ethernet network having a plurality of nodes, selected pairs of nodes being separated by links of predetermined link bandwidth capacities, a plurality of paths connecting at least two of the plurality of nodes, each of said plurality of paths being composed of at least one link. The node comprising: a receiver accepting a bandwidth reservation request including a requested bandwidth capacity, an origination point and a destination point; a data store containing available bandwidth capacity for each link in the ethernet network; and a request processor for reserving link capacity on a selected one of the plurality of paths based on said bandwidth reservation request and said available bandwidth capacity for each link of the chosen one of the plurality of paths.

In accordance with another aspect of the present invention there is provided a computer readable medium having stored thereon computer executable instructions for controlling bandwidth resources in an ethernet network having a plurality of nodes, selected pairs of said plurality of nodes being separated by links of predetermined link bandwidth capacity, the ethernet network having a plurality of paths connecting at least two of said plurality of nodes together, each of said plurality of paths being composed of at least one link. The computer executable instructions comprising the steps of: receiving a bandwidth reservation request including a requested bandwidth capacity, an origination point and a destination point; storing available bandwidth capacity for each link in the ethernet network; and reserving link bandwidth capacity for a selected one of the plurality of paths based on said bandwidth reservation request and said available bandwidth capacity for each link in the chosen one of the plurality of paths.

BRIEF DESCRIPTION OF THE DRAWINGS

The present invention will be described in conjunction with the drawings in which.

DETAILED DESCRIPTION

Figure 1:
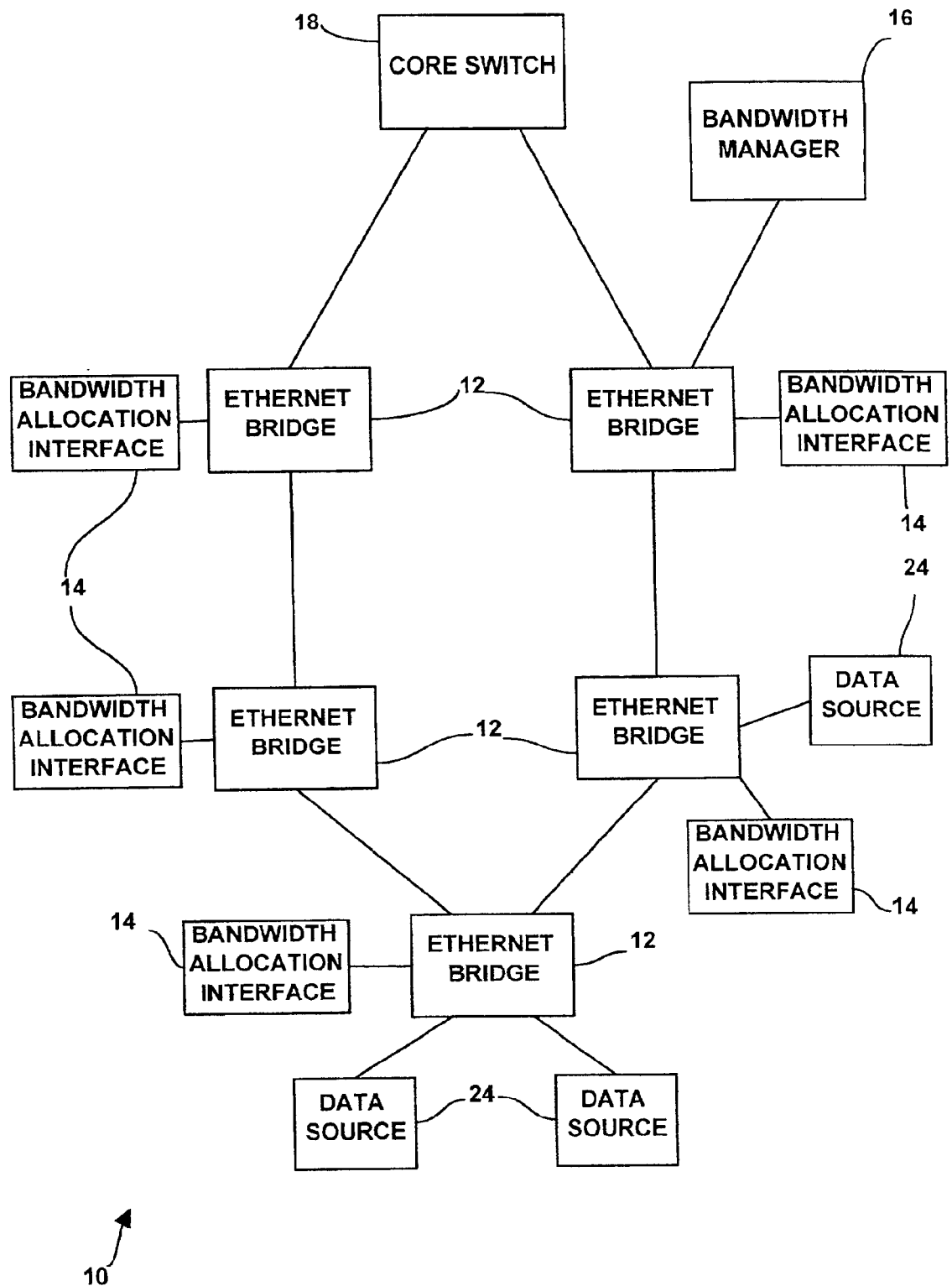
FIG. 1 illustrates a ring topology ethernet network having bandwidth allocation capabilities according to an embodiment of the present invention.

FIG. 1 is a network architecture diagram of a ring topology ethernet network 10 having bandwidth allocation capabilities according to an embodiment of the present invention. This invention enables bandwidth to be effectively assigned in the ethernet network 10 through a combination of a constrained topology network 10 and the use of a bandwidth manager 16 that creates and manages a ledger of bandwidth requests for the ethernet network 10.

Ethernet bridges 12 connect data sources 24 to the ethernet network 10. The data sources 24 may be individual data producing devices, such as computers, or the data sources may be other networks. The data sources 24 each have interfaces (not shown) at the ethernet bridges 12 connecting them and allowing them to send data between the data source 24 and the ethernet bridge 12. Packets having headers that contain a data source address for the originator and a data source address for the destination are forwarded to the ethernet bridges 12 to be sent along the ethernet network 10.

The ethernet bridges 12 are simple switching devices and do not contain routing functions. The ethernet bridges 12 learn what data sources 24 are connected to each ethernet bridge 12 by looking at the data source address for the originator in each data packet that passes through the bridge 12 and remembering the interface the packet arrived on. The ethernet bridges 12 all have data stores (not shown) that contain a listing of the data source addresses and corresponding interfaces that may be used for translating data source addresses for the destination into an interface to which a received packet may be forwarded.

Connected within the ethernet network 10 to the ethernet bridges 12 is a core switch 18 that interfaces the ethernet network 10 with a second network (not shown). The second network to which the core switch 18 is interfacing can be a network using a different communications protocol or physical layer than the ethernet network 10. The core switch 18 examines the packets it receives and determines a destination point on the second network. The packet can then be forwarded to its destination point. The core switch 18 can also analyze the entire packet to look for errors that would keep the packet from propagating through the second network. The core switch 18 may employ a number of switching technologies, such as ATM, TDM cross-connects or MPLS switches. In all three cases, the core switch 18 would assign bandwidth to connections in the second network to ensure that the bandwidth requested in the ethernet network 10 is provided end-to-end for the packets.

The bandwidth management for a ring topology is described in network 10. The bandwidth reservation and allocation capabilities in the network 10 are found in a bandwidth manager 16 and bandwidth allocation interfaces 14. The bandwidth manager 16 may be a separate component attached one of the switches in the network 10, or alternatively, the functions of the bandwidth manager 16 may be contained in one of the ethernet bridges 12.

The bandwidth manager 16 is the single source in the network 10 for the allocation and reservation of bandwidth. When a data source 24 connected to one of the ethernet bridges 12 desires bandwidth reservation the bandwidth manager 16 is contacted and the request is made. The bandwidth manager 16, once bandwidth availability for each link in the network 10 has been determined, reserves the requested bandwidth. The originating data source 24 is informed that the bandwidth has been reserved and prepares the packet headers accordingly.

The bandwidth allocation interfaces 14 are each connected to each of the ethernet bridges 12 to enable the bridges 12 to communicate with the bandwidth manager 16. The bandwidth allocation interface 14 negotiates with the bandwidth manager 16 for bandwidth reservation. The role of the bandwidth allocation interface 14 is to accept requests for bandwidth from data sources 24 and to forward those requests to the bandwidth manager 16.

For CBR (Constant Bit Rate) traffic, the packet headers have a priority status indictor noting that the traffic must be forwarded at the highest priority. Control traffic might run at a higher priority than CBR but since control traffic has a very low volume the bandwidth manager 16 includes control traffic in its highest priority allocation. To provide the required service for CBR traffic, the ethernet bridges 12 have an absolute priority queuing mechanism ("serve to exhaustion") for the highest priority traffic. If the ethernet bridge 12 has a configurable bandwidth allocation mechanism, the bandwidth manager 16 must communicate back to each ethernet bridge 12 to modify the bandwidth to reflect the increase (or decrease if a connection is terminated) in requested bandwidth.

Only data sources 24 that are participating in the reservation mechanism are allowed to send packets with packet headers set to the highest priority to ensure only registered users have access to this service. This is controlled by both the bandwidth manager 16 and the bandwidth allocation interface 14 by comparing the source address in a packet header with a list containing those data sources 24 that have permission to reserve bandwidth on the network 10.

The bandwidth manager 16 reserves the required bandwidth for traffic around the network 10. This ensures that if there is a break in the network 10, either due to failure of an ethernet bridge 12 or a cut in the link between a pair of ethernet bridges 12, traffic can be forwarded in the opposite direction around the network 10 to reach the destination without concern for congestion, i.e. the bandwidth is allocated to all links around the entire network 10. Since the network topology has been constrained to a ring in this case, the bandwidth can be allocated without explicit knowledge for each connection by each ethernet bridge 12.

In the ring topology where all traffic is destined to the core switch 18, link between the ethernet bridges 12 may have different link capacity. For example, the links furthest away from the core switch 18 may have a lower link capacity than those links closer to the core switch 18.

Figure 2:
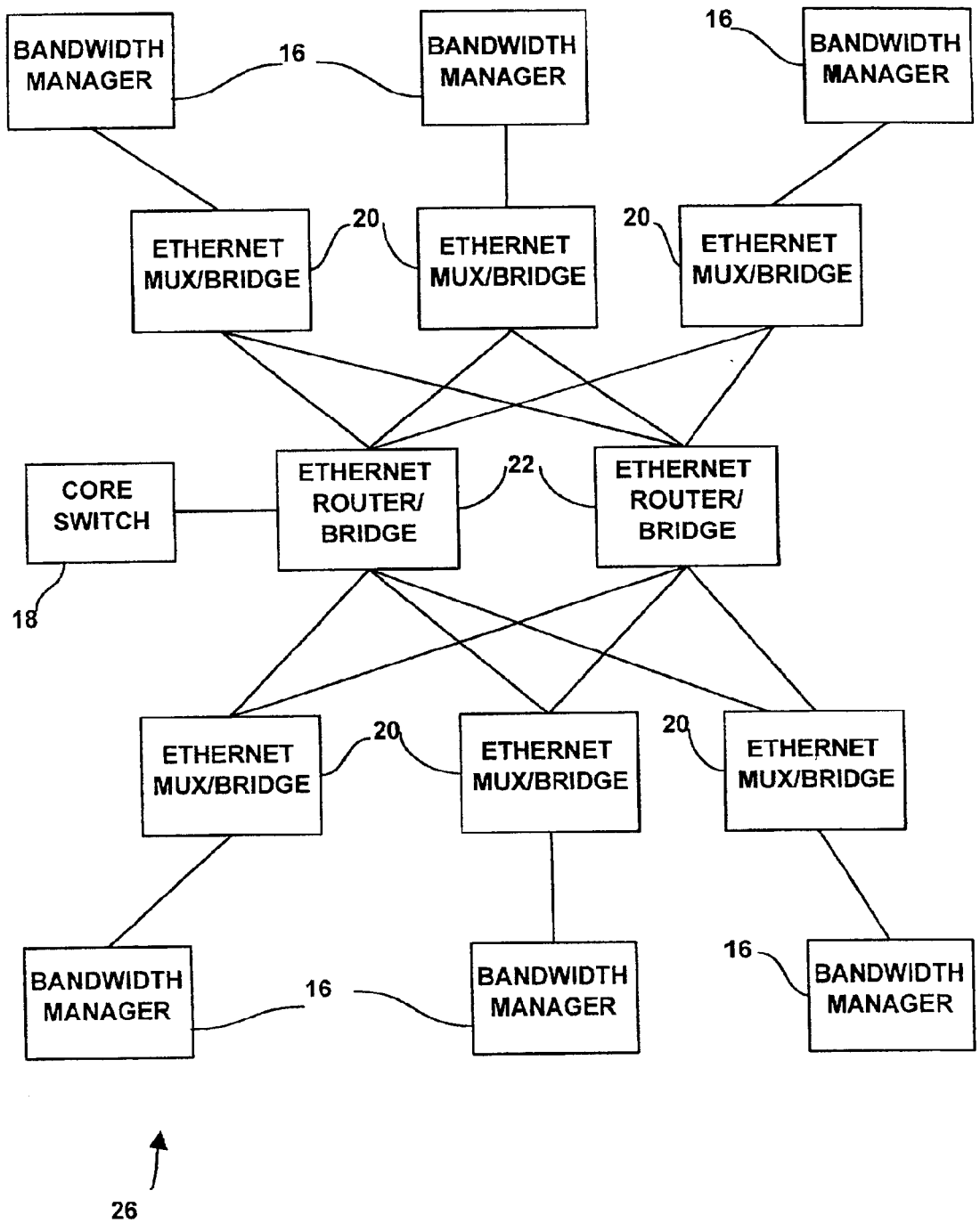
FIG. 2 illustrates a star topology ethernet network having bandwidth allocation capabilities according to an embodiment of the present invention.

FIG. 2 is a network architecture diagram of a star topology ethernet network 26 having bandwidth allocation capabilities according to an embodiment of the present invention. Ethernet multiplexers(muxes)/bridges 12 connect and multiplex multiple data sources 24 to the network 26. Traffic from multiple data sources 24, such as individual data producing devices or networks, are multiplexed together at the ethernet mux/bridge 20 to be passed to an ethernet switch 22.

Each ethernet mux 20 is aware of all the data sources 24 that are directly connected to that mux 20. Since the ethernet switches 22 are not interconnected all traffic flows from originating mux 20 to one ethernet switch 22 to destination mux 20. That is, each ethernet mux 22 is connected to the same ethernet switch 22 as the destination mux 20. In this constrained architecture each mux 20 operates a local instance of a bandwidth manager 16 to ensure that there is no congestion on the link to the ethernet switches 22 that would violate the bandwidth contracts requested by the data sources 24. The bandwidth manager 16, as in FIG. 1 is the source for allocation and reservation of bandwidth.

Traffic enters the ethernet mux 20 from a data source 24 that is participating in the reservation system. The traffic is inserted into an ethernet packet (e.g. circuit emulation over MPLS over ethernet) and the destination address is the address of a port on this or another ethernet mux 20. The packet is forwarded from the mux 20 to the ethernet switch 22 where the destination address is examined and the packet is then forwarded onto the destination.

Multiple ethernet mux/bridges 20 are redundantly connected to multiple ethernet switches 22. Each ethernet switch 22 is connected to the same ethernet muxes/bridges 20. That is, each ethernet mux/bridge 20 is individually connected to each ethernet switch 22. In this manner, if one of the ethernet switches 22 fails then the other ethernet switch 22 will take over the functions of the failed switch 22.

The ethernet switches 22 are unaware of the bandwidth allocations made by the ethernet muxes 20, making it possible for the ethernet switch 22 to forward a connection request to the mux 20 that exceeds the remaining bandwidth on the link between the mux 20 and the ethernet switch 22. In this situation, the mux 20 will refuse the request back to the source mux 20. In the star topology 26, there is not a bandwidth allocation interface since the bandwidth manager 16 is operated in the mux 20 (i.e. not centralized as in the ring topology) and therefore there is no need to communicate with a remote bandwidth manager.

The core switch 18 in the star network 26 is connected to each of the ethernet routers 22. The core switch 18, as in FIG. 1, interfaces the ethernet network 26 with another network. The network to which the core switch 18 is interfacing can be a network using a different communications protocol or physical layer than the ethernet network 10.

Figure 3:
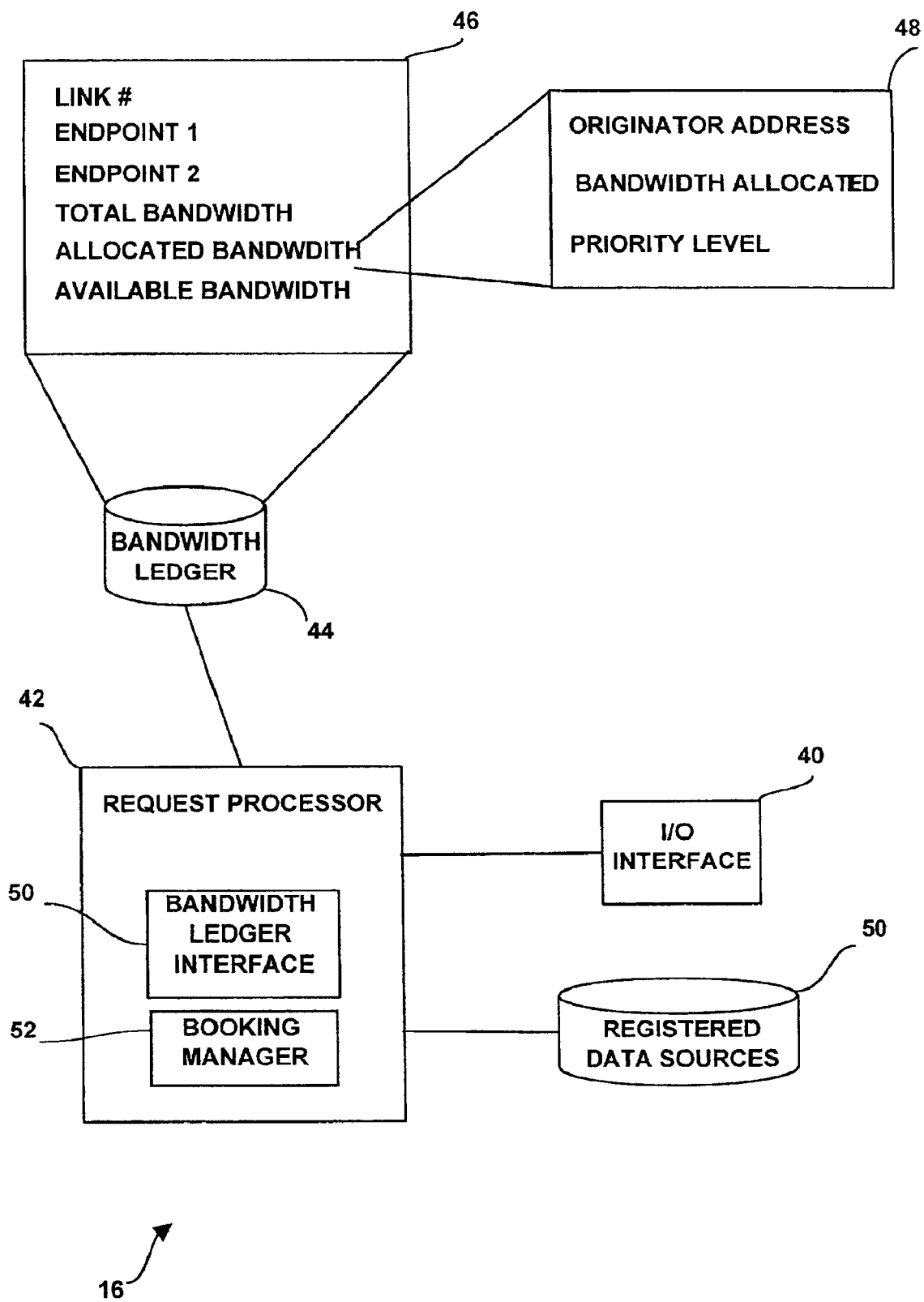
FIG. 3 illustrates a system diagram of a bandwidth manager according to an embodiment of the present invention.

FIG. 3 is a system diagram of a bandwidth manager 16 according to an embodiment of the present invention. Bandwidth request packets from the bandwidth allocation interfaces 14 requesting bandwidth are received at an I/O interface 40 and passed to a request processor 42. The request processor 42 is responsible for coordinating bandwidth reservation request processing. The request processor 42 extracts the requested bandwidth capacity from the bandwidth request packet and consults a bandwidth ledger 44 to determine if there is sufficient bandwidth available on all links in the path to be taken by the traffic.

The bandwidth ledger 44 includes a main table 46 containing basic information on each of the links in the network 10, 26. The links are defined by the two endpoints on the link. As different links may have different bandwidth capacity, the total bandwidth for each link is noted with the allocated and available bandwidth. For the bandwidth that has been allocated an allocation table 48 provides details of each reservation for the link. Allocated bandwidth has an identifier that is assigned to the source of the traffic. This allows audit to be performed to ensure that bandwidth is not assigned to a source that no longer exists. Each identifier has an associated bandwidth amount that has been reserved and an associated priority level.

The bandwidth manager 16 may keep separate ledgers for different services such as CBR (Constant Bit Rate) and VBR (Variable Bit Rate). For CBR requests, the bandwidth manager 16 must ensure that the full bandwidth request is allocated to the requester since CBR guarantees that the sender can send at the requested rate with absolutely no loss of information. For VBR traffic, the bandwidth manager 16 may choose to allocate more bandwidth than is available since for VBR as the user is not given an absolute guarantee but a probability that they can send at the requested rate.

The request processor 42 has a bandwidth ledger interface 50 and a booking manager 52. The bandwidth ledger interface 50 provides the request processor 42 with an interface to the bandwidth ledger 44. The bandwidth ledger interface 50 enables the request processor 42 to access the tables 46, 48 containing bandwidth capacity information. The information accessed by the bandwidth ledger interface 50 allows the request processor 42 to determine if there is enough bandwidth capacity of the links between the origination and destination points to complete a received bandwidth reservation request. The booking manager 52 receives an indication that there is sufficient bandwidth and reserves capacity on each link between the destination and origination points as indicated in a bandwidth reservation request.

The bandwidth manager 16 also contains a registered data sources table 50 that lists all data sources 24 that are registered to use the bandwidth reservation offered by the bandwidth manager 16. Upon receiving a request for bandwidth reservation, the request processor 42 consults the data sources table 50 to ensure the data source 24 requesting the bandwidth reservation is registered to use the service.

Figure 4:
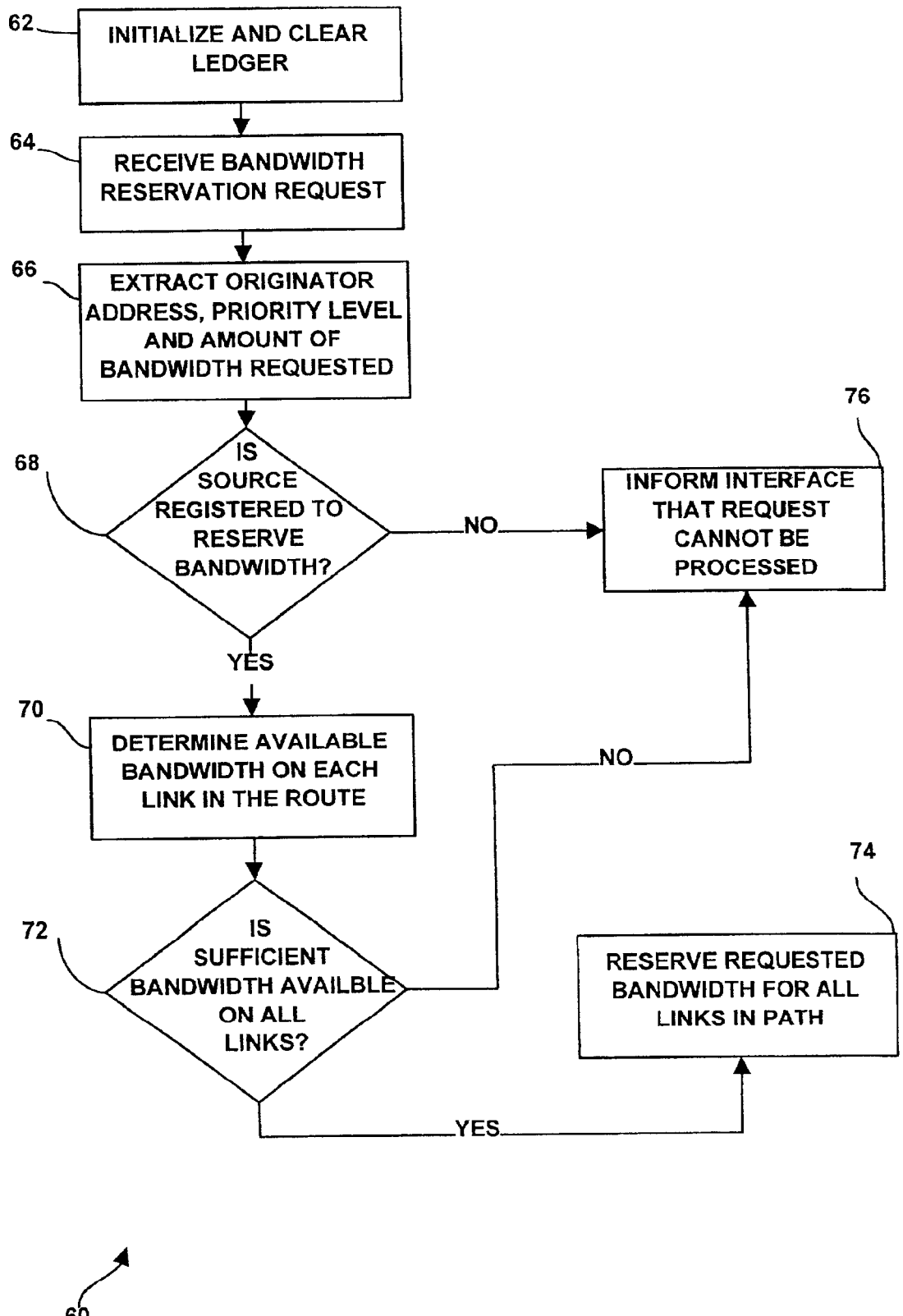
FIG. 4 illustrates a flow diagram of the bandwidth manager according to an embodiment of the present invention.

FIG. 4 is a flow diagram of the bandwidth manager 16 according to an embodiment of the present invention. At initialization the bandwidth manager 16 would clear the bandwidth ledger 44 of allocated bandwidth to zero for all links in step 62. A request for bandwidth reservation is received in step 64 at the bandwidth manager 16 from the bandwidth allocation interface 14. The request contains the originator address, the priority level of the traffic and the amount of bandwidth requested. The information contained in the request is extracted in step 66. The bandwidth manager 16 checks to confirm that the requesting data source 24 is registered to reserve bandwidth in step 68. If the requesting data source 24 is not registered then the bandwidth allocation interface 14 that sent the request is informed that the request could not be completed in step 76.

Based on the path through the network the traffic will follow the bandwidth manager 16 checks each link for the available bandwidth in step 70. The path will be dependant on the topology of the network. For example, in a ring configuration the path is considered to be the entire ring network so bandwidth on every link in the network must be reserved. In a star configuration only bandwidth on those links between originator and destination ethernet muxes and a connecting ethernet switch needs to be reserved. The available bandwidth is compared in step 72 to the request for bandwidth to ensure there is sufficient available bandwidth for the requested reservation. If there is insufficient bandwidth on at least one of the links in the path then the bandwidth allocation interface 14 is informed in step 76 that the request for bandwidth reservation cannot be completed.

If there is sufficient bandwidth available on all links then the bandwidth manager 16 reserves the requested bandwidth for all links in the path in step 74. This is accomplished by adding an entry to the allocation table 48 of each link in the route. Each new entry in each allocation table 48 for each link will contain identical information (i.e. originator address, bandwidth allocated and priority level of traffic).

Figure 5:
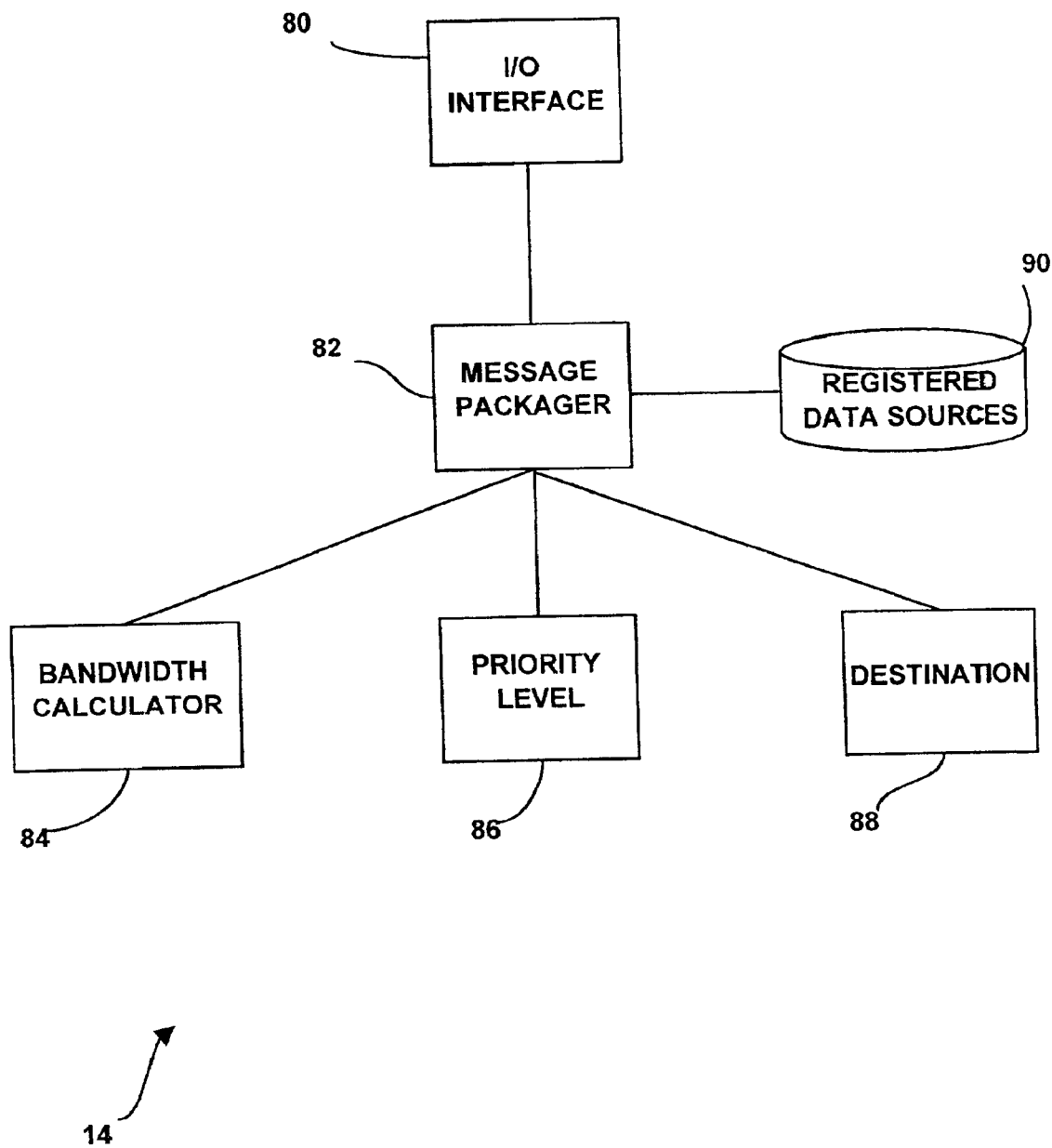
FIG. 5 illustrates a system diagram of a bandwidth allocation interface for an ethernet bridge according to an embodiment of the present invention.

FIG. 5 is a system diagram of a bandwidth allocation interface 14 for an ethernet bridge according to an embodiment of the present invention. An I/O interface 80 connects the bandwidth allocation interface 14 with the ethernet bridge 12. The I/O interface 80 sends messages to the bandwidth manager 16 requesting a reservation of bandwidth.

The bandwidth reservation requests are prepared by a message packager 82 connected to the I/O interface 80. The message packager 82 receives information from a bandwidth calculator module 84, a priority level module 86 and a destination module 88. The information received from these modules 84, 86, 88 is the basis for the bandwidth reservation request.

The bandwidth allocation interface 14 contains a registered data source table 90 having a list of all data sources 24 connected to the ethernet bridge 12 of the bandwidth allocation interface 14 that are registered to reserve bandwidth. The message packager 82 consults the registered data source table 90 to determine if a bandwidth reservation request should be forwarded based on whether or not the originator is listed as being registered to reserve bandwidth.

The bandwidth calculator module 84, the priority level module 86 and the destination module 88 extract data from traffic coming into the ethernet bridge 12 that is destined for the network 10. The destination module 88 examines all traffic coming into the ethernet bridge 12 to determine its destination point. If the detected destination point is accessible by the network 10 then the destination module 88 extracts the destination point from the traffic and forwards this information to the message packager 82. This causes the priority level module 86 to be invoked to determine the traffic type. Based on the traffic type the priority level module 86 can determine whether or not bandwidth needs to be reserved. If the traffic is time-sensitive, such as voice, then the priority level module 86 informs the bandwidth calculator module 84 that bandwidth must be reserved. The priority level module 86 passes the priority level of the traffic to the message packager 82. The bandwidth calculator module 84 determines the amount of bandwidth that needs to be requested and forwards this to the message packager 82. Upon receipt of the bandwidth amount the message packager 82 creates a request for bandwidth that is transmitted to the bandwidth manager 16.

It is apparent to one skilled in the art that numerous modifications and departures from the specific embodiments described herein may be made without departing from the spirit and scope of the invention.

What is claimed is:

1. A bandwidth manager for controlling bandwidth resources in an ethernet network having a plurality of nodes, selected pairs of nodes being separated by links of predetermined link bandwidth capacities, the ethernet network having a plurality of paths connecting at least two of the plurality of nodes together, each of said plurality of paths being composed of at least one link, said bandwidth manager comprising:

means for receiving a bandwidth reservation request including a requested bandwidth capacity, an origination point and a destination point;

means for storing available bandwidth capacity for each link in the ethernet network; and means for reserving link bandwidth capacity on a selected one of the plurality of paths based on said bandwidth reservation request and said available bandwidth capacity for each link in the selected one of the plurality of paths.

2. The bandwidth manager of claim 1 wherein said means for reserving link bandwidth capacity includes:

means for consulting said means for storing to determine if the bandwidth capacity available for all links in the selected one of the plurality of paths is greater than the requested bandwidth capacity; and means for reserving bandwidth for the links of the selected one of the plurality of paths if the bandwidth reservation request can be satisfied for all links in the selected one of the plurality of paths.

3. The bandwidth manager of claim 1 further including means for determining the selected one of the plurality of paths based on the origination point and the destination point in the bandwidth reservation request.

4. A method of controlling bandwidth resources in an ethernet network having a plurality of nodes, selected pairs of nodes being separated by links of predetermined link bandwidth capacities, the ethernet network having a plurality of paths connecting at least two of said plurality of nodes together, each of said plurality of paths being composed of at least one link, said method comprising the steps of:

receiving a bandwidth reservation request including a requested bandwidth capacity, an origination point and a destination point;

storing available bandwidth capacity for each link in the ethernet network; and reserving link bandwidth capacity on a selected one of the plurality of paths based on said bandwidth reservation request and said available bandwidth capacity for each link in the selected one of the plurality of paths.

5. The method of claim 4 wherein said step of reserving link bandwidth capacity includes the steps of:

consulting the stored bandwidth information to determine if the bandwidth capacity available for all links in the selected one of the plurality of paths is greater than the requested bandwidth capacity; and reserving bandwidth for the links of the selected one of the plurality of paths if the bandwidth reservation request can be satisfied for all links in the selected one of the plurality of paths.

6. The method of claim 1 further including the step of determining the selected one of the plurality of paths based on the origination point and the destination point in the bandwidth reservation request.

7. A node on an ethernet network for controlling bandwidth resources, the ethernet network having a plurality of nodes, selected pairs of nodes being separated by links of predetermined link bandwidth capacities, a plurality of paths connecting at least two of the plurality of nodes, each of said plurality of paths being composed of at least one link, said node comprising:

a receiver accepting a bandwidth reservation request including a requested bandwidth capacity, an origination point and a destination point;

a data store containing available bandwidth capacity for each link in the ethernet network; and a request processor for reserving link capacity on a selected one of the plurality of paths based on said bandwidth reservation request and said available bandwidth capacity for each link of the chosen one of the plurality of paths.

8. The node of claim 7 wherein said request processor includes:

a data store interface for accessing said data store to determine if the bandwidth capacity available for all links in the selected one of the plurality of paths is greater than the requested bandwidth capacity; and a booking manager for reserving bandwidth for the links of the selected one of the plurality of paths if the bandwidth reservation request can be satisfied for all links in the selected one of the plurality of paths.

9. The node of claim 7 further including a path choosing module for determining the selected one of the plurality of paths based on the origination point and the destination point in the bandwidth reservation request.

10. A computer readable medium having stored thereon computer executable instructions for controlling bandwidth resources in an ethernet network having a plurality of nodes, selected pairs of said plurality of nodes being separated by links of predetermined link bandwidth capacity, the ethernet network having a plurality of paths connecting at least two of said plurality of nodes together, each of said plurality of paths being composed of at least one link, said computer executable instructions comprising the steps of:

receiving a bandwidth reservation request including a requested bandwidth capacity, an origination point and a destination point;

storing available bandwidth capacity for each link in the ethernet network; and reserving link bandwidth capacity for a selected one of the plurality of paths based on said bandwidth reservation request and said available bandwidth capacity for each link in the chosen one of the plurality of paths.

11. The computer executable instructions of claim 10 wherein said step of reserving link bandwidth capacity includes the steps of:

consulting the stored bandwidth information to determine if the bandwidth capacity available for all links in the selected one of the plurality of paths is greater than the requested bandwidth capacity; and reserving bandwidth for the links of the selected one of the plurality of paths if the bandwidth reservation request can be satisfied for all links in the selected one of the plurality of paths.

12. The computer executable instructions of claim 10 further including the step of determining the selected one of the plurality of paths based on the origination point and the destination point in the bandwidth reservation request.

* * * * *